United States Patent [19]

Min

[11] Patent Number: 5,168,220
[45] Date of Patent: Dec. 1, 1992

[54] METHOD AND APPARATUS FOR MEASURING MOTOR SPEED USING A CONSTANT SAMPLING TIME

[75] Inventor: Chun-gi Min, Seoul, Rep. of Korea

[73] Assignee: Samsung Electronics Co., Ltd., Kyunggi-do, Rep. of Korea

[21] Appl. No.: 630,588

[22] Filed: Dec. 20, 1990

[51] Int. Cl.⁵ .................... G01P 3/481; G01P 3/489
[52] U.S. Cl. ..................................... 324/166; 364/565
[58] Field of Search ............... 324/160, 166; 364/565; 361/240

[56] References Cited

U.S. PATENT DOCUMENTS

| | | | |
|---|---|---|---|
| 4,485,452 | 11/1984 | Cording et al. | 324/166 X |
| 4,584,528 | 4/1986 | Ohmae et al. | 324/166 |
| 4,667,297 | 5/1987 | Kawai | 324/166 X |
| 4,716,535 | 12/1987 | Yoshida et al. | 324/166 X |
| 4,794,551 | 12/1988 | Yoshida | 324/166 X |
| 4,885,710 | 12/1989 | Hersberger et al. | 364/565 |
| 4,977,525 | 12/1990 | Blackwell | 324/166 X |

*Primary Examiner*—Gerard R. Strecker
*Attorney, Agent, or Firm*—Rothwell, Figg, Ernst & Kurz

[57] ABSTRACT

A method and apparatus for measuring a motor speed in which a measurement pulse train is formed from a measurement signal generated in a frequency generator coupled to the rotation of a motor, and a reference pulse train is formed with a frequency greater than that of the measurement pulse train, and the number of both pulses are counted for a predetermined sampling time, and both count values are compared, thereby measuring the motor speed. Accordingly, the rotation speed can be measured by a single algorithm regardless of the variation of the motor speed, and the measurement time and the measurement error can be greatly decreased. Furthermore, the continuous speed controlling over the whole speed range is possible.

3 Claims, 2 Drawing Sheets

METHOD AND APPARATUS FOR MEASURING MOTOR SPEED USING A CONSTANT SAMPLING TIME

FIELD OF THE INVENTION

The present invention relates to a method for measuring the speed of a motor and apparatus for performing the method, and more particularly to a new method and apparatus for measuring a motor speed which can simplify an algorithm for measuring the speed of a motor, such as a capstan motor in a VTR (video tape recorder), having a wide range of variable speeds.

BACKGROUND OF THE INVENTION

In a conventional VTR, a capstan motor is used for controlling the advancing speed of the tape past a transducer. Nowadays, the VTR tends towards a multifunctional and high quality system, thus the rotation speed of the capstan motor should be exactly measured for controlling the system over a wide speed range such as a still picture, a slow motion, and fast forward and reverse speed replay.

A conventional motor speed measuring method has been executed as follows. In FIG. 1, signal pulse FG is obtained from a frequency pulse generator attached to a capstan motor. The period of a reference wave Tc between a point b delayed by a predetermined time from the falling edge a of pulse FG and a next delay point d is counted. From the falling edge a of the pulse, a bias time Tb for detecting speed is then set. From the end point f of the bias time Tb, counting is executed to the delay point d to determine the count value Ts as a speed measurement. If the rotation speed becomes faster, the period T of the FG pulse becomes short, thereby decreasing the count value Ts. On the contrary, if the speed becomes slower, the period T becomes longer to increase the count value Ts. Td denotes the total time for determining the rotation speed.

Accordingly, if the speed becomes much faster to make T<Tb, the next delayed point d of the signal pulse FG precedes the point f, thus the value of speed measurement Ts becomes "0". On the other hand, if the speed becomes much slower to make T>Tb+Tb, the next delayed point d of the signal pulse FG becomes above the value of $2^n-1$ which is the maximum set value for the count value Ts, and the value of the speed measurement has the value of $2^n-1$ regardless of the speed. Thus, in high speed and low speed region, the errors in the speed measurement value are generated. Accordingly, there arises a problem in that the speed detecting bias time Tb should be varied according to the speed. That is, the speed detecting bias time Tb should be controlled to be shortened in a high speed mode, and to be lengthened in a low speed mode. But, in order to vary the time Tb according to a speed mode, a complicated algorithm is required, so that the speed measuring program becomes very complicated.

SUMMARY OF THE INVENTION

Accordingly, to solve the above problem, it is an object of the present invention to provide a method for measuring a motor speed with a simplified algorithm for measuring the speed of a motor which has a very wide variable range of speed.

To achieve the above object, the method of the present invention comprises the steps of:

producing a measurement pulse train whose frequency is proportional to the rotation speed of the motor, and producing a reference pulse train having a frequency fc greater than that of the measurement pulse train;

determining a sampling time of the measurement pulse train and the reference pulse train;

measuring the number m1 of measurement pulses and the number m2 of reference pulses by respectively counting the numbers of inputted measurement pulses and the reference pulses for the sampling time; and determining a rotation speed Nf of the motor as revolutions per minute by the following equation A:

$$Nf = \frac{60 \cdot fc}{P} \cdot \frac{m1}{m2}, \qquad A$$

where P is the number of measurement pulses per rotation of the motor.

Also, it is another object of the present invention to provide an apparatus for measuring the speed of a capstan motor in a VTR, which is particularly suitable for carrying out the method.

To achieve the above-mentioned object, the apparatus according to the present invention comprises:

a frequency generator coupled to a motor, for producing a measurement signal having a frequency corresponding to a rotation speed of the motor;

means for generating a measurement pulse train by converting the measurement signal to a square wave;

means for generating a reference pulse train having a frequency greater than that of the measurement train;

means for generating a start signal initiated in response to the measurement pulse train;

means for setting a sampling time by counting the reference pulses in response to the start signal;

means for generating an end signal initiated in response to the measurement pulse train and reset by the sampling time setting means;

means for counting the reference pulses in response to the end signal;

means for counting the measurement pulses in response to the end signal; and operation processing means for determining the rotation speed of the motor by a predetermined relationship between the results of the reference and measurement pulse counting means on being interrupted by the end signal.

BRIEF DESCRIPTION OF THE DRAWINGS

The above objects and other advantages of the present invention will become more apparent by the following description of the preferred embodiment of the present invention with reference to the attached drawings, in which.

DETAILED DESCRIPTION OF THE INVENTION

Hereinafter, a preferred embodiment of the present invention will be described with reference to the attached drawings.

Figure 1:
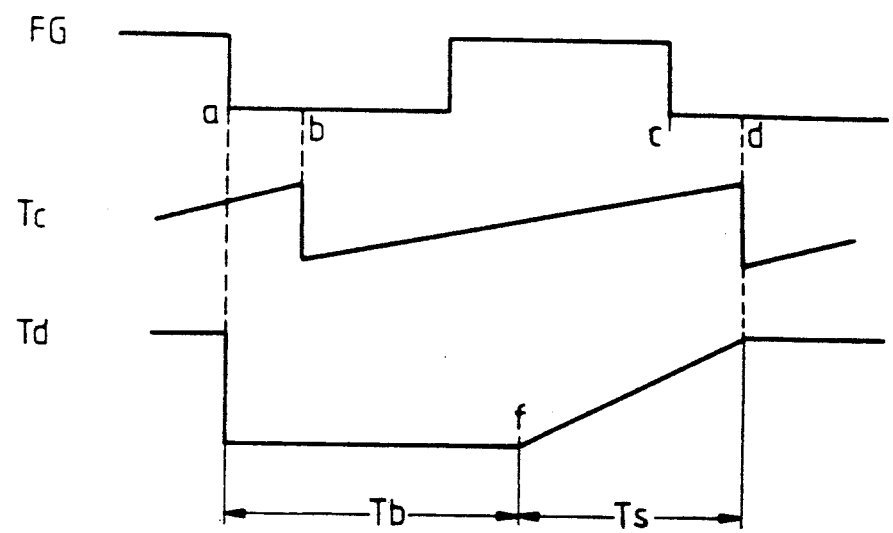
FIG. 1 is a waveform chart for explaining the conventional method for measuring a motor speed.
Figure 2:
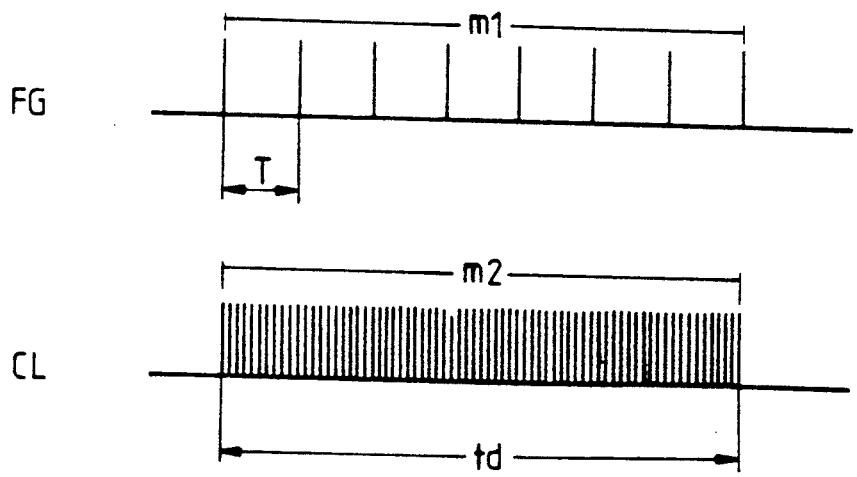
FIG. 2 is a waveform chart for explaining the method of measuring a motor speed according to the present invention.

FIG. 2 is a waveform chart explaining the method of measuring a motor speed, according to the present invention. Referring to FIG. 2, a waveform FG is a measurement pulse obtained by converting a measurement signal from a frequency generator of the motor to a square wave having narrow pulse widths. In the measurement pulse, the frequency and the period T vary according to the motor speed. It is preferred that the frequency fc of a waveform CL as a reference pulse clock is on the order of ten to 100 times as large as that of the measurement pulse for a maximum rotation speed of the motor. When a sampling time for measuring the motor speed is set to td, and the number of reference pulses and the number of measurement pulses counted for the sampling time are indicated as m2 and m1 respectively, the motor speed can be measured by the following equation. That is, the rotation speed Nf of motor as revolutions per minute is determined by the following equation:

$$Nf = K \frac{m1}{m2} \text{ (RPM)}.$$

Here, the constant K is $$K = \frac{60 fc}{P},$$

where fc is a reference pulse frequency in cycles per second and P is the number of measurement pulses per rotation of the motor.

Here, when the measurement pulse number m1 is below 1 in the above equation, i.e., when a period of the waveform FG is greater than sampling time td, m1 is set to 1. Accordingly, $m1 \leq 1$, i.e., $Td \leq T$ means a low speed measuring region, and at this time, the value of speed measurement is determined by the reciprocal value of the reference pulse number m2.

Also, in a high speed region, when $m1 \geq 2$, i.e., $td \geq T$, the value of the speed measuring measurement is determined by the ratio of the measurement pulse number m1 to the reference pulse number m2.

Figure 3:
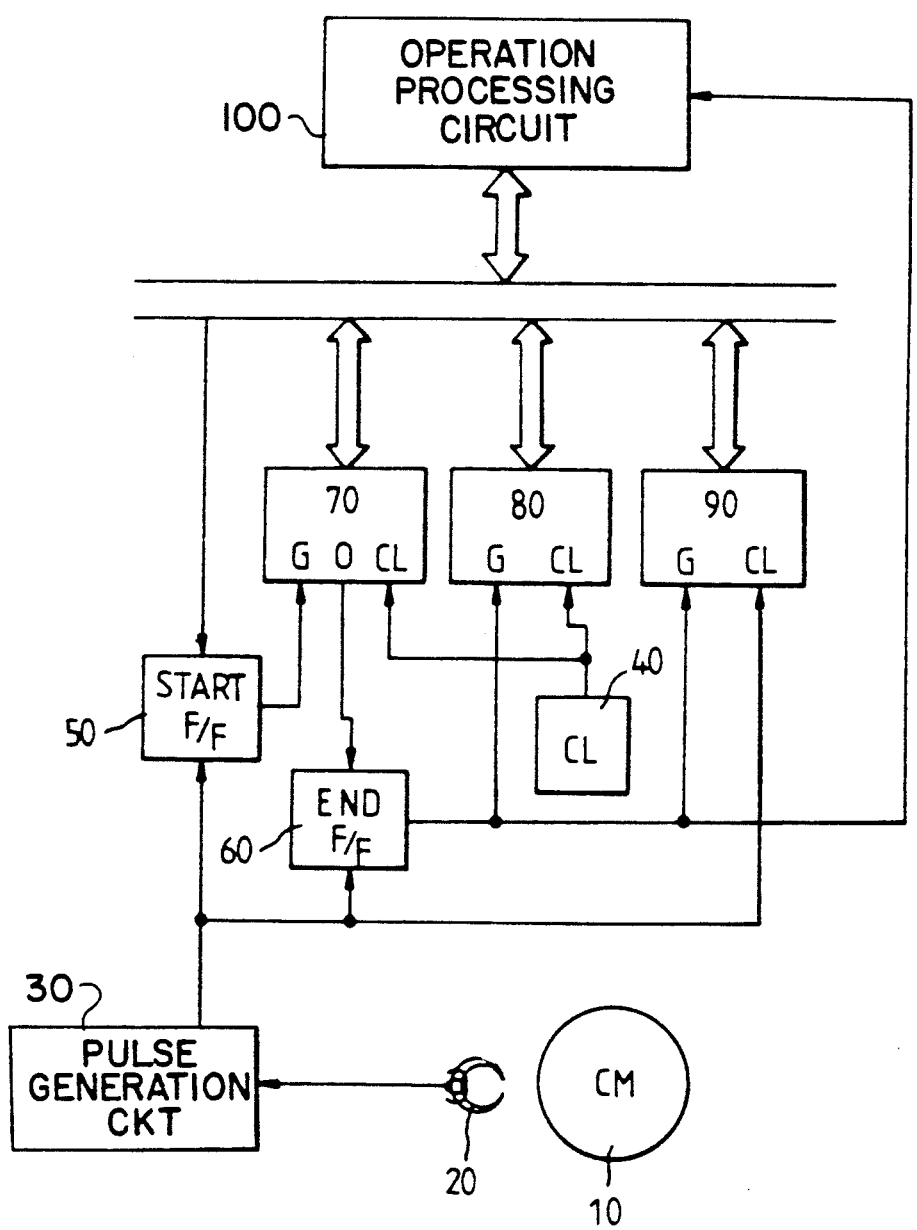
FIG. 3 is a block diagram of an apparatus for measuring a motor speed, which is particularly suitable for practicing the method of the present invention.

FIG. 3 is a block diagram of a preferred embodiment in which the method of the present invention is applied to an apparatus for measuring the speed of capstan motor in a VTR.

Referring to FIG. 3, a signal having a frequency proportional to the rotational speed of a motor is supplied from a frequency generator 20 of a capstan motor 10 to a measurement pulse generating circuit 30.

The measurement pulse generating circuit 30 shapes the waveform of the signal from the frequency generator 20, to produce a measurement pulse of a square wave having a narrow pulse width. The measurement pulse (i.e., a waveform FG shown in FIG. 2) is supplied to start signal generating circuit 50, end signal generating circuit 60, and measurement pulse counting circuit 90, respectively. The start signal generating circuit 50 consists of a flip-flop which is set by the measurement pulse and reset by the completion of the speed detection. The output of the flip-flop is supplied to an enable terminal G of counting circuit 70 for counting a pulse sampling time td for a speed measurement. The reference pulse generating clock 40 generates a reference pulse (i.e., a waveform CL shown in FIG. 2) having a clock frequency fc, and supplies the generated reference pulse to a clock inputting terminal CL of the counting circuit 70 for counting the sampling time and a clock inputting terminal CL of the reference pulse counting circuit 80, respectively. The counting circuit 70 is enabled by the set operation of the start signal generating circuit 50 to count reference pulses from clock 40, and is disabled by the reset operation of the start signal generating circuit 50 at the expiration of the sampling time td, which is set in circuit 70 via the bus line from operation processing circuit 100. At this time, circuit 70 supplies a signal for resetting the end signal generating circuit 60 to the output terminal O. The end signal generating circuit 60 consists of a flip-flop which is set by the measurement pulse from circuit 30 and reset by the signal from terminal O of circuit 70. The output of the end signal generating circuit 60 is supplied to the enable terminals of the reference pulse counting circuit 80 and the measurement pulse counting circuit 90, respectively. Accordingly, in the counting circuit 80 and 90, the count values of reference pulses and measurement pulses are respectively started by a set operation of the end signal generating circuit 60 and are stopped by a reset operation. Accordingly, an operation processing circuit 100, i.e., a microcomputer is interrupted and reads a sampling time td, a reference pulse number m2 and a measurement pulse number m1 via bus lines from the counting circuit 70, 80 and 90 and supplies a measurement completion signal to the start signal generating circuit 50 to reset circuit 50 as stated above. If the measurement pulse number m1 is below 1 within the sampling time td, i.e., td<T, the number of motor rotations per minute is calculated from the equation Nf=60 fc/P·(1/m2) to determine the motor speed, and if the measurement pulse number m1 is above 2, i.e., $td \geq T$, the number of motor rotations per minute is calculated from the equation Nf=60 fc/P·(m1/m2) to determine the motor speed.

According to the present invention, since the speed in a low speed region is detected by counting the number of reference pulses between pulses FG, i.e., measurement pulses, and the speed in a high speed region is detected by the ratio of the measurement pulse number to the reference pulse number, the speed measurements can be done by a single algorithm regardless of the motor speed, so that the program processing time is very short, and the speed measurement error is greatly decreased. Also, the speed can be linearly controlled from a low speed to a high speed.

What is claimed is:

1. A method of measuring the speed of a motor, comprising the steps of:

generating a measurement pulse train having a frequency proportional to a rotational speed of a motor;

generating a reference pulse train having a frequency fc greater than a maximum frequency of said measurement pulse train;

setting a constant sampling time for counting said measurement pulses and said reference pulses;

counting a number of pulses of said measurement pulse train during said set sampling time;

counting a number of pulses of said reference pulse train during said set sampling time; and determining a rotational speed of said motor in revolutions per minute according to the equation $$Nf = \frac{60\,fc}{P} \cdot \frac{m1}{m2}$$

where
Nf is the rotational speed of the motor,
P is the number of measurement pulses per rotation of the motor,
m1 is the counted number of measurement pulses, and
m2 is the counted number of reference pulses; and
wherein m1 is set to a minimum value of 1 when a time interval between successive measurement pulses is longer than said sampling time.

2. A method of measuring the speed of a motor according to claim 1, wherein said frequency fc is ten times the maximum frequency of said measurement pulse train.

3. An apparatus for measuring the speed of a motor, comprising:
  means for generating a measurement signal having a frequency proportional to the rotational speed of a motor;
  means for generating a reference signal having a frequency greater than a maximum frequency of said measurement signal;
  means for setting a constant sampling time for counting the cycles of said measurement signal and said reference signal;
  means for counting the cycles of said reference signal during said sampling time;
  means for counting the cycles of said measuring signal during said sampling time;
  means for determining the rotational speed of said motor upon expiration of said sampling time based upon a predetermined relationship with the number of counted cycles of said reference and measurement signals, the frequency of said reference signal, and the proportionality relation between the frequency of said measurement signal and the rotation of said motor;
  wherein said predetermined relationship is defined by the equation $$Nf = \frac{60\,fc}{P} \cdot \frac{m1}{m2}$$

where
Nf is the rotational speed of the motor,
fc is the frequency of said reference signal,
m1 is the number of counted cycles of said measurement signal,
m2 is the number of counted cycles of said reference signal, and
P is the number of cycles of said measurement signal per rotation of said motor; and
wherein m1 is set to 1 as a minimum value when a time interval between successive measurement pulses is larger than said sampling time.

* * * * *

UNITED STATES PATENT AND TRADEMARK OFFICE
CERTIFICATE OF CORRECTION

PATENT NO. : 5,168,220
DATED : December 1, 1992
INVENTOR(S) : Chun-gi Min

It is certified that error appears in the above-identified patent and that said Letters Patent is hereby corrected as shown below:

Col. 3, line 45, after "speed" insert --measuring--.

Col. 3, line 46, delete "measuring".

Col. 4, line 36, "60" should be --(60--.

Col. 4, line 37, "fc/P" should be --fc/P)--.

Col. 4, line 40, "60 fc/P" should be --(60 fc/P)--.

Signed and Sealed this

Twenty-sixth Day of October, 1993

Attest:

BRUCE LEHMAN

*Attesting Officer*　　*Commissioner of Patents and Trademarks*